UNITED STATES PATENT OFFICE.

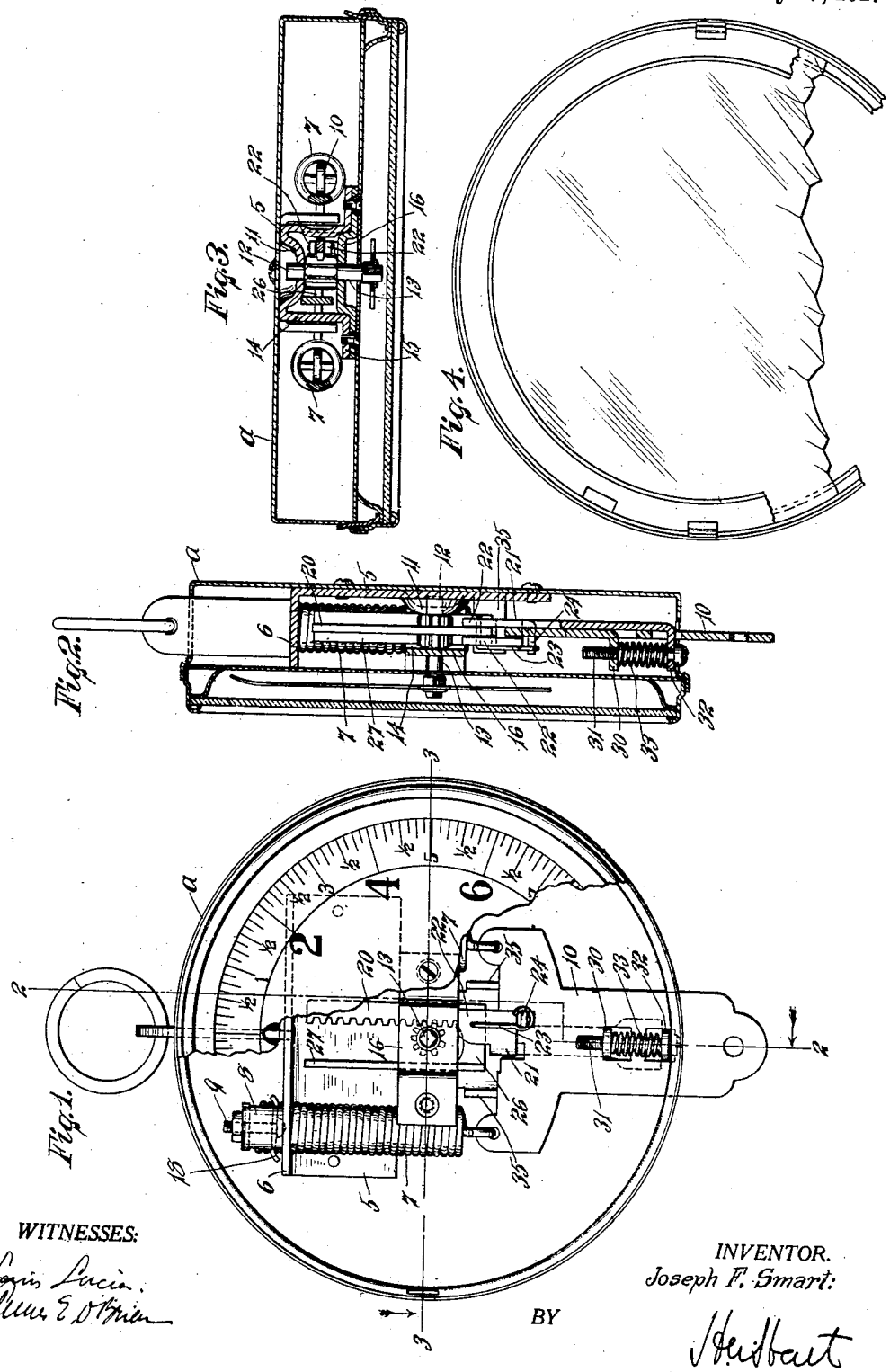

JOSEPH F. SMART, OF NEW BRITAIN, CONNECTICUT, ASSIGNOR TO LANDERS, FRARY & CLARK, OF NEW BRITAIN, CONNECTICUT, A CORPORATION OF CONNECTICUT.

SCALE.

1,233,721.  Specification of Letters Patent.  Patented July 17, 1917.

Application filed March 14, 1916. Serial No. 84,047.

*To all whom it may concern:*

Be it known that I, JOSEPH F. SMART, a citizen of the United States, and a resident of New Britain, county of Hartford, State of Connecticut, have invented certain new and useful Improvements in Scales, of which the following is a specification.

The object of this invention is to provide an improved construction of scales, the improvements including among other things the novel method of supporting the scale mechanism within the case, a novel adjustment for the balance springs, a novel arrangement of the tare adjusting mechanism, the dial mounting, and a securing means for the glass. Other features of the invention will be more particularly pointed out in the following specification and claims.

In the drawings—

Figure 1 is a front view of a scale embodying my invention, with a part of the dial broken away.

Fig. 2 is a sectional side view on the line 2—2 of Fig. 1.

Fig. 3 is a transverse sectional view on the line 3—3 of Fig. 1.

Fig. 4 is an inside view of the rim.

Referring to the drawings, *a* denotes the case which is cupped up to shape from sheet metal, and within which the weighing mechanism is mounted.

Secured to the back of the case is a base plate 5, the upper edge of which is bent at right angles to the base to form a supporting ledge 6 apertured near each end for the passage through it of the balance springs 7, 7; fitting over the upper ends of the balance springs above the ledge 6 are thimbles 8, which support pins 9, which project down inside of the balance springs and have at their ends cross pieces 18, which extend laterally between the coils of the spring. The thimbles are cut away so that the ends of these cross pieces can project out and thus be engaged by the thimbles as they are rotated to adjust the cross pieces longitudinally of the springs.

It will be seen that the springs are supported through these cross pieces and the pins from the thimbles which rest on the ledge 6, and that the effective part of the springs is that part below the cross pieces, and that the length of the effective part can be varied by rotating the cross pieces by the thimbles. To the lower ends of the springs is secured the tail piece 10, the end of which projects through the bottom of the case to receive any holding device, such as a pan, hook, etc.

The base is cupped up as at 11, to provide a bearing for the rear end 12 of the pinion shaft 13, and at either side of this cupped-up part are upstanding legs 14 having their ends oppositely bent to form lateral flanges 15 upon which rests a cross piece 16 centrally apertured to form a bearing for the front end of the pinion shaft. The dial is apertured to receive the pinion shaft and fits on to this cross piece being secured to the lateral flanges of the upstanding legs in any suitable manner, as by screws.

From the foregoing description it will be seen that the balance springs and other parts of the weighing mechanism are supported by the rigid base which is secured to the base of the case, and that the dial is also supported thereon. The case is usually made of light material which can be spun or cupped, to shape, and the weighing mechanism is not affected by any distortion of this case.

The rack 20 is connected to the tare-adjusting slide 21, which is formed of sheet metal having its upper end folded over to provide ears 22, 22, between which the rack is fitted, being pivoted thereto by the pin 23 which is bent down and looped about a stump 24 on the slide; this arrangement holds the rack in place but provides for a convenient manner of dislodging it for purposes of adjustment, etc. At the lower end of the rack is a lateral extension 26, and secured thereto and upstanding therefrom is a counter-balance 27 which holds the rack in mesh with the pinion. This counter-balance is arranged in approximate parallelism with the rack and lies between the upstanding legs upon which the dial is secured, providing a very compact arrangement which is efficient for the purposes for which it is designed.

The tare-adjusting slide 21 extends down back of the tail piece 10 and has a lug 32 projecting through an aperture in the tail piece and which is engaged by a screw 31 supported in a lug 30 on the tail piece, the spring 33 acting to hold the slide in adjusted position and binding with sufficient force to prevent the accidental turning of the adjusting screw. At the lower end of the base are two upstanding arms 35, 35, against which the tail piece rests when the balance springs are unloaded. They act as stops to limit the sudden upward movement of the tail piece and prevent the rack from striking the pinion and either dislodging it or jamming its teeth.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

I claim as my invention:—

1. In a device of the character described, a case, a base piece secured to a wall thereof, an overhanging ledge at the upper end of the base piece, one or more balance springs supported by said overhanging ledge, means arranged above said ledge for adjusting said springs, a tail piece secured to the lower ends of said springs, a pinion mounted in said base piece, and a rack carried by said tail piece and meshing with said pinion.

2. In a device of the character described, a case, a base secured to a wall thereof, an overhanging ledge at the upper end of said base having apertures, balance springs extending through apertures in said ledge, thimbles resting upon said ledge and adapted to receive the ends of said springs, members adjustably engaged with said springs and operatively engaged by said thimbles, a tail piece carried by said springs, a pinion mounted in said base, and a rack carried by said tail piece and meshing with said pinion.

3. In a device of the character described, a ledge having apertures, balance springs extending through the apertures in said ledge, thimbles resting upon said ledge and enveloping the upper ends of said springs, and means carried by said thimbles and adjustably engaged with said springs to support the latter.

4. In a device of the character described, an apertured support, a thimble resting upon said support above said aperture, a spring extending through the aperture and with its upper end within said thimble, a member connected with and adjustable longitudinally of said spring, and a supported connection between said member and thimble.

5. In a device of the character described, an apertured support, a spring extending through said aperture, a member connected with and adjustable lengthwise of said spring, and means for supporting said member from said support.

6. In a device of the character described, an apertured support, a spring extending through said aperture, a member engaged with and adjustable longitudinally of the spring, a thimble enveloping the end of said spring and constituting a support for said member, and interengaging parts on said thimble and member.

7. In a device of the character described, an apertured support, a spring extending through said aperture, a member engaged with and adjustable longitudinally of the spring, a thimble enveloping the end of said spring and constituting a support for said member, said thimble being cut away at one side to provide a shoulder engageable with an end of said member.

8. In a device of the character described, a case, a base secured to a wall thereof, a bearing in said base, upstanding legs at either side of said bearing, a cross piece resting on said legs and having a bearing in alinement with the bearing in the base, a pinion shaft mounted in said bearings, a pinion on said shaft between said base and cross piece, balance springs supported by said base, a tail piece secured to the lower ends of said balance springs, a rack secured to said tail piece and movable between said legs in mesh with said pinion, and a counter-balance movable with said rack between said legs and arranged at the opposite side of said pinion from said rack.

9. In a device of the character described, the combination with the balance springs, a tail piece secured thereto, and a pinion with a suitable mounting therefor, of a tare-adjusting slide adjustably connected with said tail piece, said slide being formed from sheet metal folded upon itself at its upper end to provide spaced ears, a rack located between said ears, a pivot pin passing through said ears and rack, a stump on said slide, and a loop on said pivot pin engaged with said stump.

JOSEPH F. SMART.

Copies of this patent may be obtained for five cents each, by addressing the "Commissioner of Patents, Washington, D. C."